United States Patent
Rantzau et al.

(10) Patent No.: US 12,197,396 B2
(45) Date of Patent: **\*Jan. 14, 2025**

(54) USING PERSISTENT MEMORY TO ENABLE RESTARTABILITY OF BULK LOAD TRANSACTIONS IN CLOUD DATABASES

(71) Applicant: Cisco Technology, Inc., San Jose, CA (US)

(72) Inventors: Ralf Rantzau, San Jose, CA (US); Madhu S. Kumar, San Mateo, CA (US); Johnu George, San Jose, CA (US); Amit Kumar Saha, Bangalore (IN); Debojyoti Dutta, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,097

(22) Filed: Aug. 30, 2022

(65) Prior Publication Data
US 2022/0414065 A1   Dec. 29, 2022

Related U.S. Application Data

(63) Continuation of application No. 15/811,124, filed on Nov. 13, 2017, now Pat. No. 11,481,362.

(51) Int. Cl.
*G06F 16/18* (2019.01)
*G06F 11/14* (2006.01)
(Continued)

(52) U.S. Cl.
CPC .......... *G06F 16/1865* (2019.01); *G06F 11/14* (2013.01); *G06F 11/1402* (2013.01);
(Continued)

(58) Field of Classification Search
CPC .................... G06F 16/1865; G06F 16/2358
(Continued)

(56) References Cited

U.S. PATENT DOCUMENTS

| | | | | |
|---|---|---|---|---|
| 5,287,501 A | * | 2/1994 | Lomet | G06F 11/1474 707/648 |
| 5,305,200 A | * | 4/1994 | Hartheimer | G06Q 40/04 705/37 |

(Continued)

FOREIGN PATENT DOCUMENTS

| | | |
|---|---|---|
| CN | 101719930 A | 6/2010 |
| CN | 101394360 B | 7/2011 |

(Continued)

OTHER PUBLICATIONS

Saidi Ali G., et al., "Performance Validation of Network-Intensive Workloads on a Full-System Simulator," Interaction between Operating System and Computer Architecture Workshop, (IOSCA 2005), Austin, Texas, Oct. 2005, 10 pages.

(Continued)

*Primary Examiner* — Tony Mahmoudi
*Assistant Examiner* — Michael Le
(74) *Attorney, Agent, or Firm* — Polsinelli P.C.

(57) ABSTRACT

Systems, methods, and computer-readable media for managing storing of data in a data storage system using a client tag. In some examples, a first portion of a data load as part of a transaction and a client identifier that uniquely identifies a client is received from the client at a data storage system. The transaction can be tagged with a client tag including the client identifier and the first portion of the data load can be stored in storage at the data storage system. A first log entry including the client tag is added to a data storage log in response to storing the first portion of the data load in the storage. The first log entry is then written from the data (Continued)

storage log to a persistent storage log in persistent memory which is used to track progress of storing the data load in the storage.

17 Claims, 10 Drawing Sheets

(51) Int. Cl.
    *G06F 16/23*        (2019.01)
    *G06F 16/27*        (2019.01)
    *H04L 43/00*        (2022.01)
    *H04L 67/10*        (2022.01)
    *H04L 67/1097*     (2022.01)
    *G06F 9/455*        (2018.01)
    *H04L 67/02*        (2022.01)

(52) U.S. Cl.
    CPC .......... *G06F 16/23* (2019.01); *G06F 16/2358* (2019.01); *G06F 16/27* (2019.01); *H04L 43/00* (2013.01); *H04L 67/10* (2013.01); *H04L 67/1097* (2013.01); *G06F 9/45533* (2013.01); *H04L 67/02* (2013.01)

(58) Field of Classification Search
    USPC ........................................................ 707/648
    See application file for complete search history.

(56) References Cited

U.S. PATENT DOCUMENTS

| | | | |
|---|---|---|---|
| 5,724,581 A * | 3/1998 | Kozakura | G06F 11/1448 714/E11.13 |
| 5,812,773 A | 9/1998 | Norin | |
| 5,889,896 A | 3/1999 | Meshinsky et al. | |
| 6,067,541 A | 5/2000 | Raju et al. | |
| 6,092,086 A * | 7/2000 | Martin | G06F 16/27 |
| 6,108,782 A | 8/2000 | Fletcher et al. | |
| 6,178,453 B1 | 1/2001 | Mattaway et al. | |
| 6,185,615 B1 | 2/2001 | Labiaga et al. | |
| 6,275,863 B1 * | 8/2001 | Leff | G06F 16/2343 709/248 |
| 6,298,153 B1 | 10/2001 | Oishi | |
| 6,343,290 B1 | 1/2002 | Cossins et al. | |
| 6,643,260 B1 | 11/2003 | Kloth et al. | |
| 6,683,873 B1 | 1/2004 | Kwok et al. | |
| 6,721,804 B1 | 4/2004 | Rubin et al. | |
| 6,732,124 B1 | 5/2004 | Koseki et al. | |
| 6,733,449 B1 | 5/2004 | Krishnamurthy et al. | |
| 6,735,631 B1 | 5/2004 | Oehrke et al. | |
| 6,971,096 B1 | 11/2005 | Ankireddipally et al. | |
| 6,996,615 B1 | 2/2006 | McGuire | |
| 7,054,930 B1 | 5/2006 | Cheriton | |
| 7,058,706 B1 | 6/2006 | Iyer et al. | |
| 7,062,571 B1 | 6/2006 | Dale et al. | |
| 7,111,177 B1 | 9/2006 | Chauvel et al. | |
| 7,212,490 B1 | 5/2007 | Kao et al. | |
| 7,277,948 B2 | 10/2007 | Igarashi et al. | |
| 7,313,667 B1 | 12/2007 | Pullela et al. | |
| 7,379,846 B1 | 5/2008 | Williams et al. | |
| 7,480,672 B2 | 1/2009 | Hahn et al. | |
| 7,496,043 B1 | 2/2009 | Leong et al. | |
| 7,536,476 B1 | 5/2009 | Alleyne | |
| 7,546,354 B1 | 6/2009 | Fan et al. | |
| 7,567,504 B2 | 7/2009 | Darling et al. | |
| 7,606,147 B2 | 10/2009 | Luft et al. | |
| 7,647,594 B2 | 1/2010 | Togawa | |
| 7,773,510 B2 | 8/2010 | Back et al. | |
| 7,808,897 B1 | 10/2010 | Mehta et al. | |
| 7,881,957 B1 | 2/2011 | Cohen et al. | |
| 7,885,923 B1 | 2/2011 | Tawri et al. | |
| 7,917,647 B2 | 3/2011 | Cooper et al. | |
| 8,010,598 B2 | 8/2011 | Tanimoto | |
| 8,028,071 B1 | 9/2011 | Mahalingam et al. | |
| 8,041,714 B2 | 10/2011 | Aymeloglu et al. | |
| 8,121,117 B1 | 2/2012 | Amdahl et al. | |
| 8,150,805 B1 | 4/2012 | Tawri et al. | |
| 8,171,415 B2 | 5/2012 | Appleyard et al. | |
| 8,234,377 B2 | 7/2012 | Cohn | |
| 8,244,559 B2 | 8/2012 | Horvitz et al. | |
| 8,250,215 B2 | 8/2012 | Stienhans et al. | |
| 8,280,880 B1 | 10/2012 | Aymeloglu et al. | |
| 8,284,664 B1 | 10/2012 | Aybay et al. | |
| 8,301,746 B2 | 10/2012 | Head et al. | |
| 8,345,692 B2 | 1/2013 | Smith | |
| 8,406,141 B1 | 3/2013 | Couturier et al. | |
| 8,407,413 B1 | 3/2013 | Yucel et al. | |
| 8,448,171 B2 | 5/2013 | Donnellan et al. | |
| 8,477,610 B2 | 7/2013 | Zuo et al. | |
| 8,495,356 B2 | 7/2013 | Ashok et al. | |
| 8,510,469 B2 | 8/2013 | Portolani | |
| 8,514,868 B2 | 8/2013 | Hill | |
| 8,532,108 B2 | 9/2013 | Li et al. | |
| 8,533,687 B1 | 9/2013 | Greifeneder et al. | |
| 8,547,974 B1 | 10/2013 | Guruswamy et al. | |
| 8,560,639 B2 | 10/2013 | Murphy et al. | |
| 8,560,663 B2 | 10/2013 | Baucke et al. | |
| 8,589,543 B2 | 11/2013 | Dutta et al. | |
| 8,590,050 B2 | 11/2013 | Nagpal et al. | |
| 8,611,356 B2 | 12/2013 | Yu et al. | |
| 8,612,625 B2 | 12/2013 | Andries et al. | |
| 8,630,291 B2 | 1/2014 | Shaffer et al. | |
| 8,639,787 B2 | 1/2014 | Lagergren et al. | |
| 8,656,024 B2 | 2/2014 | Krishnan et al. | |
| 8,660,129 B1 | 2/2014 | Brendel et al. | |
| 8,667,033 B1 * | 3/2014 | McCline | G06F 16/289 707/827 |
| 8,719,804 B2 | 5/2014 | Jain | |
| 8,775,576 B2 | 7/2014 | Hebert et al. | |
| 8,797,867 B1 | 8/2014 | Chen et al. | |
| 8,805,951 B1 | 8/2014 | Faibish et al. | |
| 8,850,182 B1 | 9/2014 | Fritz et al. | |
| 8,856,339 B2 | 10/2014 | Mestery et al. | |
| 8,868,514 B2 * | 10/2014 | Lomet | G06F 16/27 707/648 |
| 8,909,928 B2 | 12/2014 | Ahmad et al. | |
| 8,918,510 B2 | 12/2014 | Gmach et al. | |
| 8,924,720 B2 | 12/2014 | Raghuram et al. | |
| 8,930,747 B2 | 1/2015 | Levijarvi et al. | |
| 8,938,775 B1 | 1/2015 | Roth et al. | |
| 8,959,526 B2 | 2/2015 | Kansal et al. | |
| 8,977,754 B2 | 3/2015 | Curry, Jr. et al. | |
| 8,977,898 B1 * | 3/2015 | Veeraswamy | G06F 11/1471 714/15 |
| 9,009,697 B2 | 4/2015 | Breiter et al. | |
| 9,015,324 B2 | 4/2015 | Jackson | |
| 9,043,439 B2 | 5/2015 | Bicket et al. | |
| 9,049,115 B2 | 6/2015 | Rajendran et al. | |
| 9,063,789 B2 | 6/2015 | Beaty et al. | |
| 9,065,727 B1 | 6/2015 | Liu et al. | |
| 9,075,649 B1 | 7/2015 | Bushman et al. | |
| 9,164,795 B1 | 10/2015 | Vincent | |
| 9,167,050 B2 | 10/2015 | Durazzo et al. | |
| 9,201,701 B2 | 12/2015 | Boldyrev et al. | |
| 9,201,704 B2 | 12/2015 | Chang et al. | |
| 9,203,784 B2 | 12/2015 | Chang et al. | |
| 9,223,634 B2 | 12/2015 | Chang et al. | |
| 9,244,776 B2 | 1/2016 | Koza et al. | |
| 9,251,114 B1 | 2/2016 | Ancin et al. | |
| 9,264,478 B2 | 2/2016 | Hon et al. | |
| 9,313,048 B2 | 4/2016 | Chang et al. | |
| 9,361,192 B2 | 6/2016 | Smith et al. | |
| 9,380,075 B2 | 6/2016 | He et al. | |
| 9,400,657 B2 * | 7/2016 | Busaba | G06F 9/3004 |
| 9,419,841 B1 | 8/2016 | Kozolchyk et al. | |
| 9,432,294 B1 | 8/2016 | Sharma et al. | |
| 9,442,671 B1 * | 9/2016 | Zhang | G06F 3/0635 |
| 9,444,744 B1 | 9/2016 | Sharma et al. | |
| 9,473,365 B2 | 10/2016 | Melander et al. | |
| 9,503,530 B1 | 11/2016 | Niedzielski | |
| 9,558,078 B2 | 1/2017 | Farlee et al. | |
| 9,558,232 B1 | 1/2017 | Taylor et al. | |
| 9,613,078 B2 | 4/2017 | Vermeulen et al. | |

(56) References Cited

U.S. PATENT DOCUMENTS

| | | |
|---|---|---|
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 9,842,053 B2 | 12/2017 | Joshi et al. |
| 10,025,946 B1 | 7/2018 | Holenstein et al. |
| 10,936,545 B1* | 3/2021 | Chockalingam .... G06F 11/1448 |
| 10,956,324 B1* | 3/2021 | Giles ........................ G06F 9/526 |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2002/0188617 A1 | 12/2002 | Smith et al. |
| 2003/0018591 A1 | 1/2003 | Komisky |
| 2003/0056001 A1 | 3/2003 | Mate et al. |
| 2003/0159006 A1 | 8/2003 | Frank et al. |
| 2003/0228585 A1 | 12/2003 | Noko et al. |
| 2004/0004941 A1 | 1/2004 | Malan et al. |
| 2004/0054643 A1* | 3/2004 | Vemuri .............. G06F 16/2365 |
| 2004/0054644 A1* | 3/2004 | Ganesh .............. G06F 16/2365 |
| 2004/0095237 A1 | 5/2004 | Chen et al. |
| 2004/0131059 A1 | 7/2004 | Ayyakad et al. |
| 2004/0264481 A1 | 12/2004 | Darling et al. |
| 2005/0049945 A1* | 3/2005 | Bourbonnais ........... G06F 16/27 |
| | | 714/E11.13 |
| 2005/0060418 A1 | 3/2005 | Sorokopud |
| 2005/0065987 A1 | 3/2005 | Telkowski et al. |
| 2005/0076111 A1* | 4/2005 | Cherkasova ........... G06Q 30/00 |
| | | 709/224 |
| 2005/0125424 A1 | 6/2005 | Herriott et al. |
| 2005/0138461 A1 | 6/2005 | Allen et al. |
| 2006/0104286 A1 | 5/2006 | Cheriton |
| 2006/0126665 A1 | 6/2006 | Ward et al. |
| 2006/0129872 A1* | 6/2006 | Fung ........................ H04L 1/22 |
| | | 714/4.11 |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0084880 A1 | 4/2008 | Dharwadkar |
| 2008/0165778 A1 | 7/2008 | Ertemalp |
| 2008/0172409 A1* | 7/2008 | Botros ................ G06F 16/9038 |
| 2008/0198752 A1 | 8/2008 | Fan et al. |
| 2008/0201711 A1 | 8/2008 | Amir Husain |
| 2008/0222159 A1 | 9/2008 | Aranha et al. |
| 2008/0235755 A1 | 9/2008 | Blaisdell et al. |
| 2008/0307255 A1* | 12/2008 | Chen .................. G06F 11/1469 |
| | | 714/13 |
| 2009/0006527 A1 | 1/2009 | Gingell, Jr. et al. |
| 2009/0019367 A1 | 1/2009 | Cavagnari et al. |
| 2009/0024660 A1 | 1/2009 | Borgsmidt et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313311 A1* | 12/2009 | Hoffmann ............ G06F 11/2097 |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0005124 A1 | 1/2010 | Wagner |
| 2010/0042720 A1 | 2/2010 | Stienhans et al. |
| 2010/0061250 A1 | 3/2010 | Nugent |
| 2010/0082540 A1 | 4/2010 | Isaacson et al. |
| 2010/0115341 A1 | 5/2010 | Baker et al. |
| 2010/0131765 A1 | 5/2010 | Bromley et al. |
| 2010/0191783 A1 | 7/2010 | Mason et al. |
| 2010/0192157 A1 | 7/2010 | Jackson |
| 2010/0205029 A1 | 8/2010 | Asherman et al. |
| 2010/0205601 A1 | 8/2010 | Abbas et al. |
| 2010/0211782 A1 | 8/2010 | Auradkar et al. |
| 2010/0287553 A1 | 11/2010 | Schmidt et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0246434 A1 | 10/2011 | Cheenath et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |

(56) References Cited

U.S. PATENT DOCUMENTS

| | | |
|---|---|---|
| 2012/0330769 A1 | 12/2012 | Arceo |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0054402 A1 | 2/2013 | Asherman et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117233 A1* | 5/2013 | Schreter ............. G06F 16/2358 707/648 |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0006881 A1 | 1/2014 | Loimuneva et al. |
| 2014/0032491 A1* | 1/2014 | Neerincx ............... G06F 16/23 709/227 |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089264 A1* | 3/2014 | Talagala ............. G06F 11/1448 707/649 |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0115016 A1 | 4/2014 | Perrin et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215127 A1* | 7/2014 | Perrin ............... G06F 16/2358 711/114 |
| 2014/0215471 A1 | 7/2014 | Cherkasova et al. |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0279917 A1 | 9/2014 | Minh et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0100471 A1 | 4/2015 | Curry, Jr. et al. |
| 2015/0106578 A1 | 4/2015 | Warfield et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0178133 A1 | 6/2015 | Phelan et al. |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2015/0379062 A1 | 12/2015 | Vermeulen et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0070740 A1 | 3/2016 | Vermeulen et al. |
| 2016/0094398 A1 | 3/2016 | Choudhury et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0164914 A1 | 6/2016 | Madhav et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0292166 A1 | 10/2016 | Russell |
| 2016/0342633 A1 | 11/2016 | Senthilnathan et al. |
| 2016/0344834 A1 | 11/2016 | Das |
| 2016/0350353 A1* | 12/2016 | Li ....................... G06F 16/2358 |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0031723 A1 | 2/2017 | George |
| 2017/0041342 A1 | 2/2017 | Efremov et al. |
| 2017/0054659 A1 | 2/2017 | Ergin et al. |
| 2017/0068566 A1 | 3/2017 | Hosie et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0171158 A1 | 6/2017 | Hoy et al. |
| 2017/0192863 A1 | 7/2017 | Eluri et al. |

(56) References Cited

U.S. PATENT DOCUMENTS

| | | | |
|---|---|---|---|
| 2017/0223068 | A1 | 8/2017 | Bhattacharjee et al. |
| 2017/0264663 | A1 | 9/2017 | Bicket et al. |
| 2017/0339070 | A1 | 11/2017 | Chang et al. |
| 2018/0137166 | A1* | 5/2018 | Bensberg ............ G06F 16/2379 |
| 2019/0102262 | A1 | 4/2019 | Sukhomlinov et al. |
| 2019/0138624 | A1 | 5/2019 | Menendez et al. |

FOREIGN PATENT DOCUMENTS

| | | | | |
|---|---|---|---|---|
| CN | 102164091 | A | 8/2011 | |
| CN | 104320342 | A | 1/2015 | |
| CN | 105740084 | A | 7/2016 | |
| EP | 2228719 | A1 | 9/2010 | |
| EP | 2439637 | A1 | 4/2012 | |
| EP | 2645253 | B1 | 11/2014 | |
| GB | 2472620 | A * | 2/2011 | ....... G06F 17/30575 |
| JP | H0784815 | A * | 3/1995 | .......... G06F 11/1474 |
| KR | 20150070676 | A | 6/2015 | |
| TW | M394537 | U | 12/2010 | |
| WO | WO-2006108799 | A2 * | 10/2006 | ............ G06Q 10/10 |
| WO | 2009155574 | A1 | 12/2009 | |
| WO | 2010030915 | A2 | 3/2010 | |
| WO | 2013158707 | A1 | 10/2013 | |
| WO | WO-2016032548 | A1 * | 3/2016 | ....... G06F 17/30353 |

OTHER PUBLICATIONS

Shunra, "Shunra for HP Software™, Enabling Confidence in Application Performance Before Deployment," 2010, 2 pages.
Son J., "Automated Decision System for Efficient Resource Selection and Allocation in Inter-Clouds," Jun. 2013, 35 Pages.
Sun A., et al., "IaaS Public Cloud Computing Platform Scheduling Model and Optimization Analysis," International Journal Communications, Network and System Sciences, 2011, 4, pp. 803-811.
Szymaniak M., et al., "Latency-Driven Replica Placement," IPSJ Journal, vol. 47, No. 8, Aug. 2006, 12 pages.
Toews E., "Introduction to Apache Jclouds," Apr. 7, 2014, 23 pages.
Wikipedia, "Filter (software), " Wikipedia, [Retrieved on Feb. 8, 2014], 2 pages, Retrieved from URL: https://en.wikipedia.org/w/index.php?title=Filter_%28software%29&oldid=594544359.
Wikipedia, "Pipeline (Unix)," Wikipedia, [Retrieved on May 4, 2014], 4 pages, Retrieved from URL: https://en.wikipedia.org/w/index.php?title-Pipeline2/028Unix%29&oldid=606980114.
Ye X., et al., "A Novel Blocks Placement Strategy for Hadoop," IEEE/ACTS 11th International Conference on Computer and Information Science, IEEE, 2012, 5 pages.
Amedro B., et al., "An Efficient Framework for Running Applications on Clusters, Grids and Clouds," 2010, 17 pages.
Author Unknown, "5 Benefits of a Storage Gateway in the Cloud," Blog, TwinStrata, Inc., Jul. 25, 2012, 4 pages, XP055141645, Retrieved from URL: https://web.archive.org/web/20120725092619/http://bloq.twinstrata.com/2012/07/10//5-benefits-of-a-astorage-gateway-in-the-cloud.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Apache Ambari Meetup What's New," Hortonworks Inc., Sep. 2013, 28 pages.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface (CIMI) Primer," Document No. DSP2027, Version 1.0.1, Sep. 12, 2012, 30 pages.
Author Unknown, "Cloud Infrastructure Management Interface-Common Information Model (CIMI-CIM)," Document No. DSP0264, Version 1.0.0, Dec. 14, 2012, 21 pages.
Author Unknown, "CloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Introduction," Apache Ambari project, Apache Software Foundation, 2014, 1 page.
Author Unknown, "Joint Cisco and VMWare Solution for Optimizing Virtual Desktop Delivery: Data Center 3.0: Solutions to Accelerate Data Center Virtualization," Cisco Systems Incorporated, VMware Incorporated, Sep. 2008, 10 Pages.
Author Unknown, "Microsoft Cloud Edge Gateway (MCE) Series Appliance," Iron Networks, Inc., 2014, 4 pages.
Author Unknown, "Real-Time Performance Monitoring on Juniper Networks Devices: Tips and Tools for Assessing and Analyzing Network Efficiency," Juniper Networks Incorporated, May 2010, 35 Pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Beyer S., "Module 'Data::Locations'," YAPC::Europe, London, United Kingdom, ICA, Sep. 22-24, 2000, XP002742700, 15 Pages.
Borovick L., et al., "Architecting the Network for the Cloud," IDC White Paper, Jan. 2011, 8 pages.
Bosch G., et al., "Virtualization," Lehigh University, 2012, 33 pages.
Broadcasters Audience Research Board, "What's Next," [Retrieved on Jul. 22, 2015], 2 pages, Retrieved from URL: http://www.barb.co.uk/whats-next.
Cisco Systems Inc., "Best Practices in Deploying Cisco Nexus 1000V Series Switches on Cisco UCS B and C Series Cisco UCS Manager Servers," Cisco White Paper, Apr. 2011, Retrieved from URL: http://www.cisco.com/en/us/prod/collateral/switches/ps9441/ps9902/whitepaperc11-558242.pdf, 36 Pages.
Cisco Systems, Inc., "Cisco Intercloud Fabric: Hybrid Cloud with Choice, Consistency, Control and Compliance," Dec. 10, 2014, 22 pages.
Cisco Systems Inc., "Cisco Unified Network Services: Overcome Obstacles to Cloud-Ready Deployments," Cisco White Paper, Jan. 2011, 6 Pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0," White Paper, Proof of Concept Implementation Guide, Citrix Systems, Inc., 2013, 48 pages.
Citrix, "CloudBridge for Microsoft Azure Deployment Guide," May 22, 2013, 30 pages.
Citrix, "Deployment Practices and Guidelines for NetScaler 10.5 on Amazon Web Services," White Paper, citrix.com, 2014, 14 pages.
Clarke A., et al., "Open Data Center Alliance Usage: Virtual Machine (VM) Interoperability in a Hybrid Cloud Environment Rev. 1.2," Open Data Center Alliance, 2013, pp. 1-18.
CSS Corp, "Enterprise Cloud Gateway (ECG) Policy driven framework for managing multi-cloud environments," original published on or about Feb. 11, 2012, 1 page, Retrieved from URL: http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Gedymin A., "Cloud Computing with an Emphasis on Google App Engine," Sep. 2011, 146 pages.
Good N.A., "Use Apache Deltacloud to Administer Multiple Instances with a Single API," Dec. 17, 2012, 7 pages.
Herry W., "Keep It Simple, Stupid: OpenStack Nova Scheduler and its Algorithm," IBM, May 12, 2012, 18 Pages.
Hewlett-Packard Company, "Virtual Context Management on Network Devices," Research Disclosure, vol. 564, No. 60, Apr. 1, 2011, Mason Publications, Hampshire, GB, 524, 1 page.
Juniper Networks, Inc., "Recreating Real Application Traffice in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS," Cloud Architect Musings, Jun. 26, 2013, 12 Pages.

(56) References Cited

OTHER PUBLICATIONS

Kolyshkin K., "Virtualization in Linux," Sep. 1, 2006, 5 pages, XP055141648, Retrieved from URL: https://web.archive.org/web/20070120205111/ http://download.openvz.orq/doc/openvz-intro.pdf.

Kunz T., et al., "OmniCloud—The Secure and Flexible Use of Cloud Storage Services," Whitepaper, 2014, 30 pages.

Laszewski G.V., et al., "Design of a Dynamic Provisioning System for a Federated Cloud and Bare-metal Environment," 2012, 8 pages.

Lerach S.R.O., "Golem," [Accessed on Jul. 22, 2015] Retrieved from URL: http://www.lerach.cz/en/products/golem, 2 Pages.

Linthicum D., "VM Import Could be a Game Changer for Hybrid Clouds," InfoWorld, Dec. 23, 2010, 4 pages.

Logan M., "Hybrid Cloud Application Architecture for Elastic Java-Based Web Applications," F5 Deployment Guide Version 1.1, 2016, 65 pages.

Lynch S., "Monitoring cache with Claspin," Facebook Engineering, Sep. 19, 2012, 5 pages.

Meireles F.M.D., "Integrated Management of Cloud Computing Resources," 2013-2014, 286 pages.

Mu S., et al., "μLibCloud: Providing High Available and Uniform Accessing to Multiple Cloud Storages," IEEE, 2012, 8 pages.

Naik V.K., et al., "Harmony: A Desktop Grid for Delivering Enterprise Computations," Grid Computing, Fourth International Workshop on Proceedings, Nov. 17, 2003, pp. 1-11.

Nair S.K., et al., "Towards Secure Cloud Bursting, Brokerage and Aggregation," 2012, Retrieved from URL: www.flexiant.com, 8 Pages.

Nielsen, "SimMetry Audience Measurement Technology," [Accessed on Jul. 22, 2015] Retrieved from URL: http://www.nielsen-admosphere.eu/products-and-services/simmetry-audience-measurement-technology/, 6 Pages.

Nielsen, "Television," 4 pages, [Retrieved on Jul. 22, 2015], Retrived from URL: http://www.nielsen.com/us/en/solutions/measurement/television.html.

Open Stack, "Filter Scheduler," Updated Dec. 17, 2017, 5 pages, [Retrieved on Dec. 18, 2017], Retrieved from URL: https://docs.openstack.org/nova/latest/user/filter-scheduler.html.

Rabadan J., et al., "Operational Aspects of Proxy-ARP/ND in EVPN Networks," BESS Worksgroup Internet Draft, Oct. 6, 2015, Retrieved from URL: draft-snr-bess-evpn-proxy-arp-nd-02, 22 Pages.

\* cited by examiner

USING PERSISTENT MEMORY TO ENABLE RESTARTABILITY OF BULK LOAD TRANSACTIONS IN CLOUD DATABASES

CROSS-REFERENCE TO RELATED APPLICATIONS

This application is a continuation of U.S. application Ser. No. 15/811,124, filed on Nov. 13, 2017, entitled "USING PERSISTENT MEMORY TO ENABLE RESTARTABILITY OF BULK LOAD TRANSACTIONS IN CLOUD DATABASES," which is expressly incorporated by reference in its entirety.

TECHNICAL FIELD

The present technology pertains to data storage, and in particular to resuming transactions in data storage systems using client tags.

BACKGROUND

In traditional databases, when a user transfers a large portion of data to be stored by the database management system, a user has to ensure that the entire portion of data is transferred and stored correctly by the database management system. In particular, cloud analytics often requires uploading of large files or amounts of data whereby analytics can subsequently process the files. In transferring large amounts of data, as a result of the large sizes of data, the data is transferred as part of a transaction. This presents problems if the database management system goes offline or the transfer of the data is otherwise interrupted. In particular, cloud-based data storage systems are more susceptible to connectivity issues leading to interrupted data transfer transactions. As a result, the user might have to restart transferring the data from the beginning to the database management system. This is problematic because it consumes large amounts of resources, including network bandwidth.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
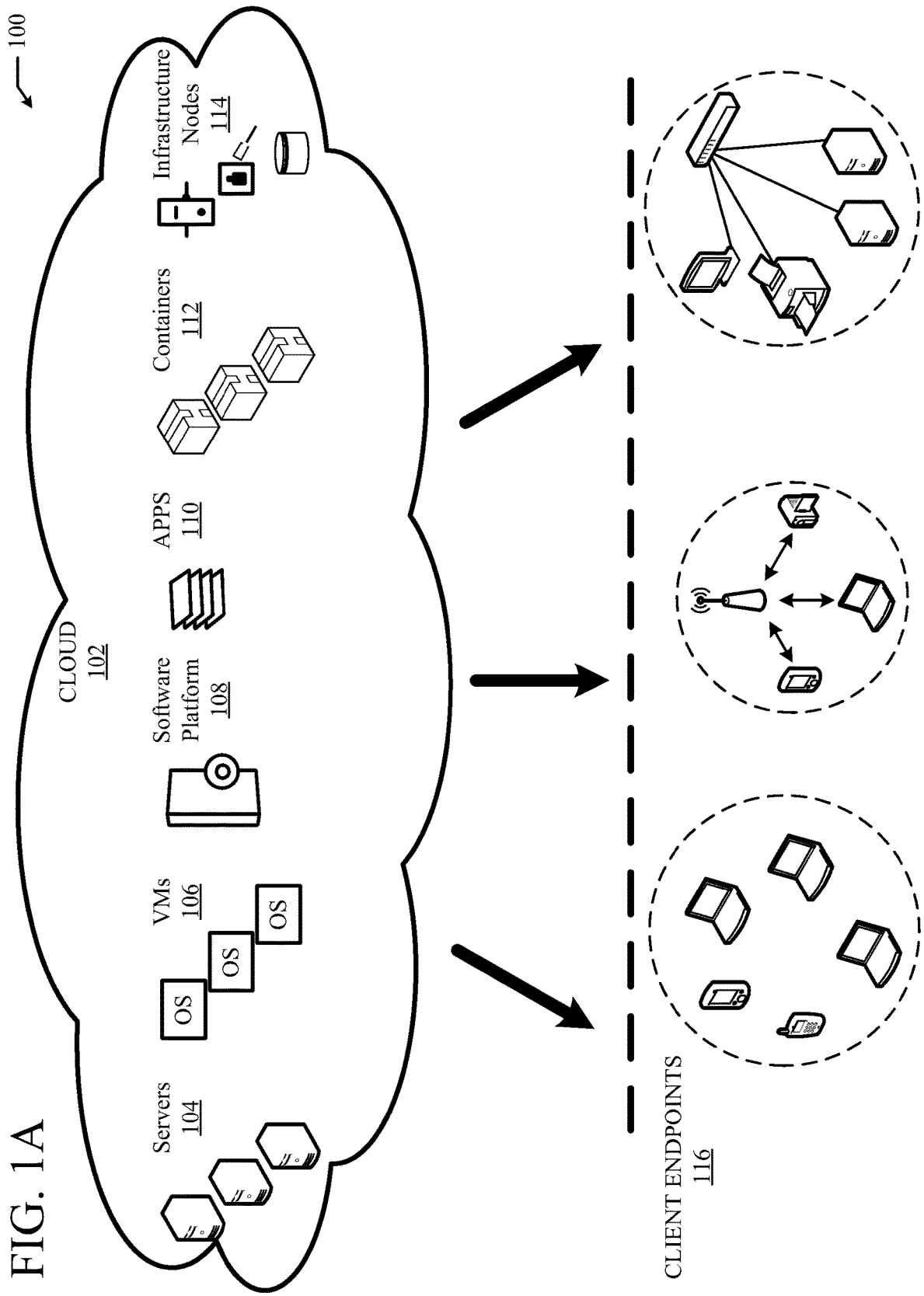
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include receiving from a client at a data storage system a first portion of a data load as part of a transaction and a client identifier that uniquely identifies the client. The transaction can be tagged with a client tag including the client identifier and the first portion of the data load can be stored in storage at the data storage system. A first log entry including the client tag can be added to a data storage log in response to storing the first portion of the data load in the storage. The first log entry can then be written from the data storage log to a persistent storage log in persistent memory which can be used to track progress of storing the data load in the storage.

A system can receive, at a data storage system from a client, a first portion of a data load as part of a transaction and a client identifier that uniquely identifies the client. The transaction can be tagged with a client tag including the client identifier. The system can add a first log entry including the client tag indicating the first portion of the data load is stored in storage at the data storage system to a data storage log as part of write-ahead logging. The system can store the first portion of the data load in the storage at the data storage system. Subsequently, the first log entry can be written from the data storage log to a persistent storage log stored in persistent memory and the first log entry stored in the persistent storage log can be used to track progress of storing the data load in the storage at the data storage system.

A system can receive, at a data storage system from a client, a first portion of a data load as part of a transaction and a client identifier that uniquely identifies the client. The transaction can be tagged with a client tag including the client identifier and the first portion of the data load can be stored in storage at the data storage system. The system can add a first log entry including the client tag to a data storage log in response to storing the first portion of the data load in the storage at the data storage system. Subsequently, the system can write the first log entry from the data storage log to a persistent storage log stored in persistent memory. The first log entry stored in the persistent storage log can be used to track progress of storing the data load in the storage at the data storage system and the progress of storing the data load in the storage at the data storage system can be used to resume transfer of the data load from the client.

Description

The disclosed technology addresses the need in the art for supporting resumption of bulk load transfers. The present technology involves system, methods, and computer-readable media for maintaining logs of load transfers in persistent memory to allow for resumption of the load transfers in the event that the bulk load transfers are interrupted.

Figure 7:
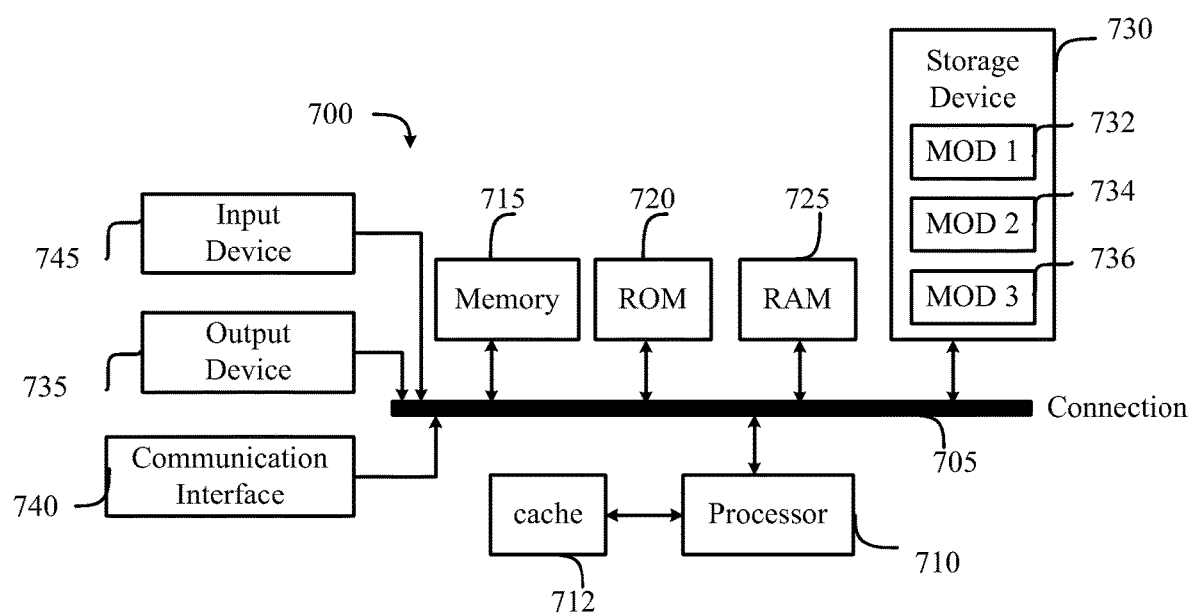
FIG. 7 illustrates an example computing system.
Figure 8:
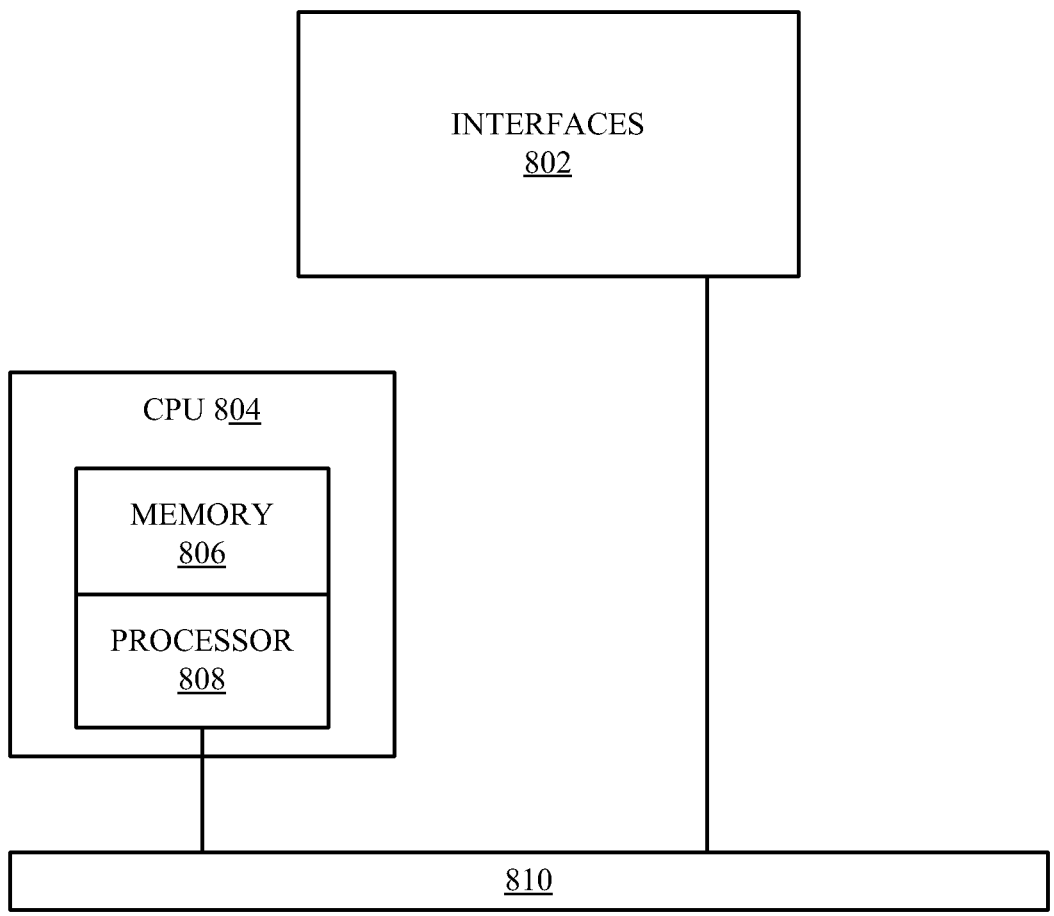
FIG. 8 illustrates an example network device.

A description of network environments and architectures for network data access and services, as illustrated in FIGS. 1A, 1B, 2A, and 2B, is first disclosed herein. A discussion of systems and methods for resuming transactions in data storage systems using client tags, as shown in FIGS. 3, 4, 5, and 6, will then follow. The discussion then concludes with a brief description of example devices, as illustrated in FIGS. 7 and 8. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
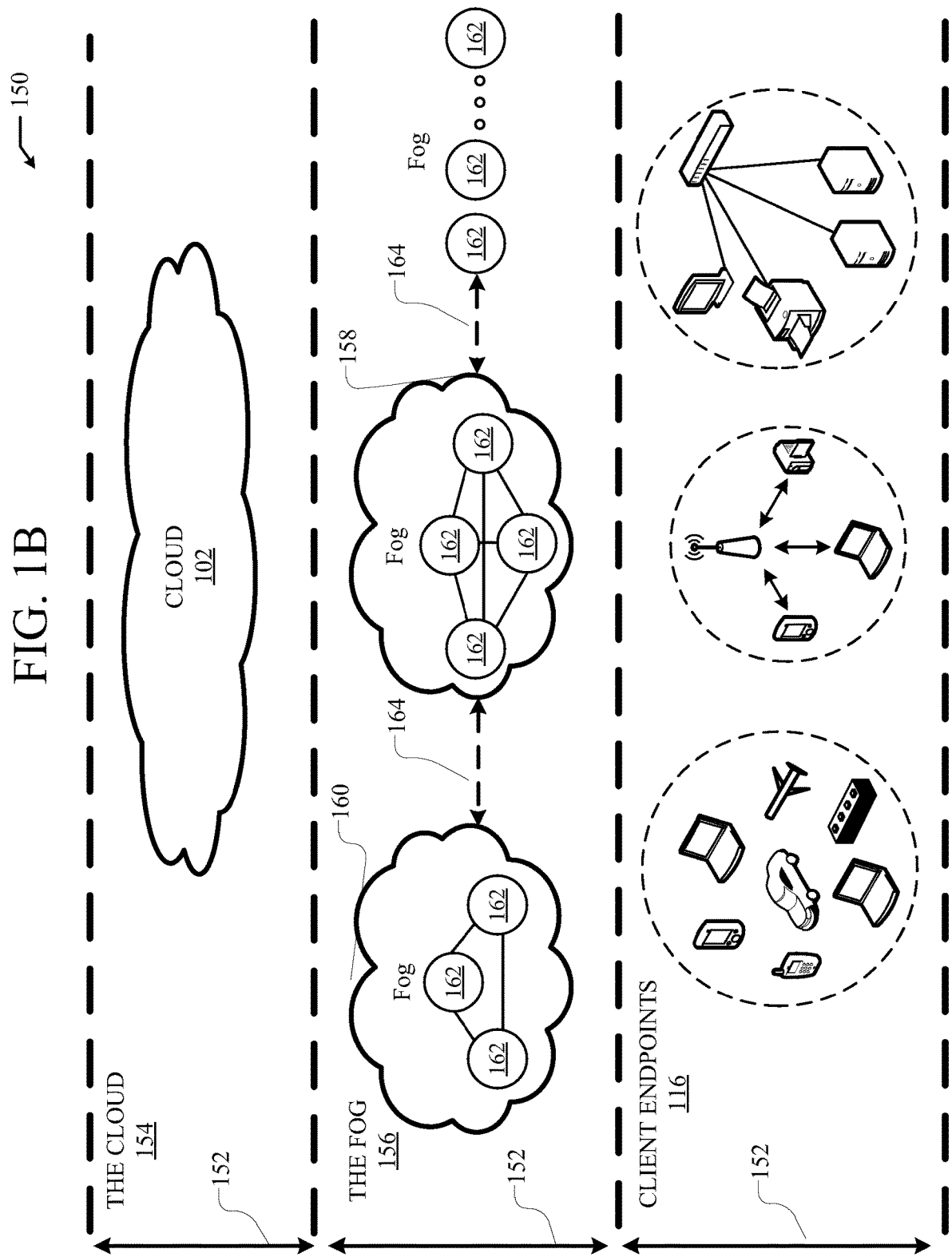
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
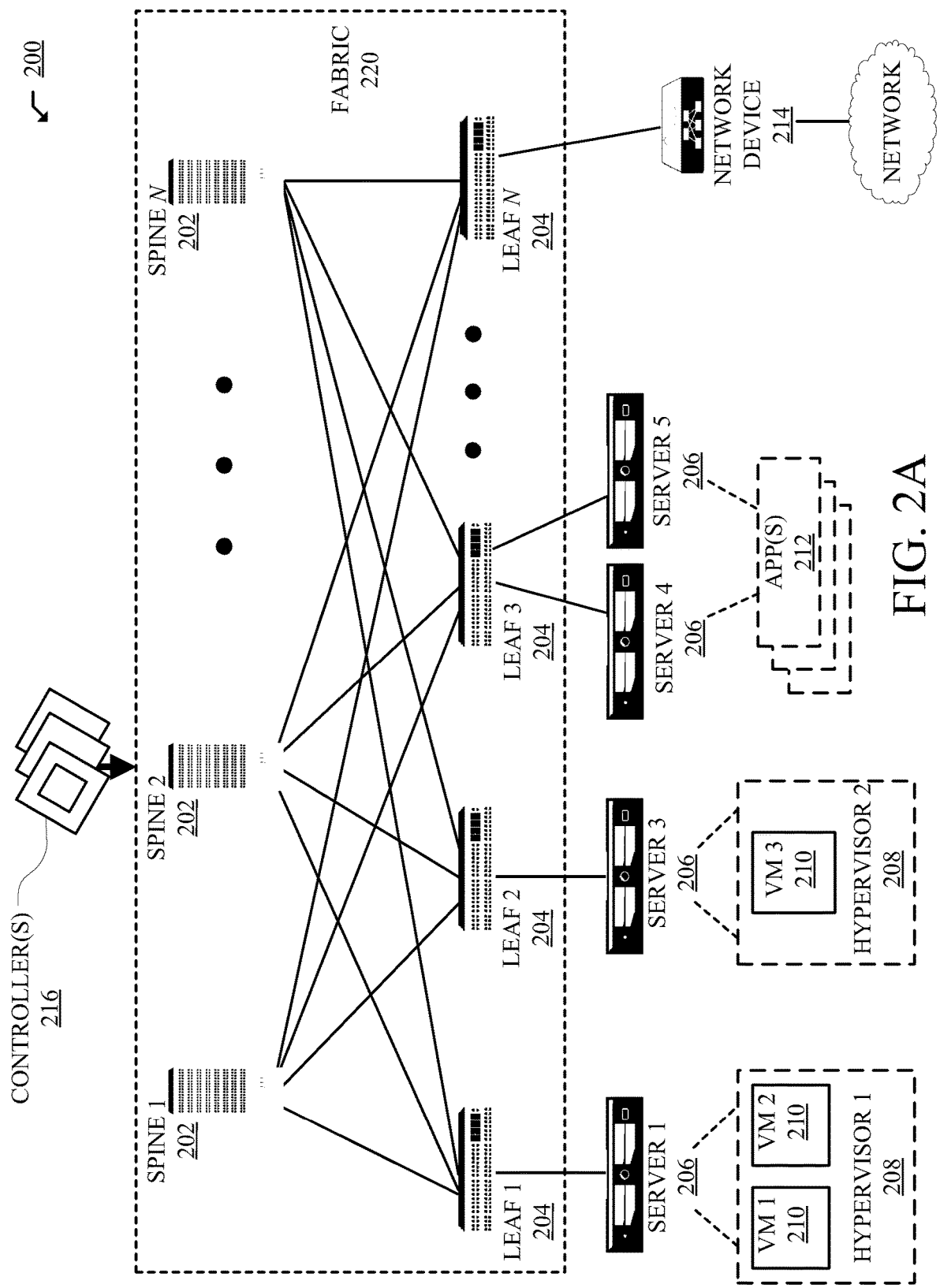
FIG. 2A illustrates a diagram of an example Network Environment.

FIG. 2A illustrates a diagram of an example Network Environment 200, such as a data center. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, Virtual Machines (VMs) 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 and/or Hypervisors 208 can be migrated to other Servers 206. Servers 206 can similarly be migrated to other locations in Network Environment 200. For example, a server connected to a specific leaf can be changed to connect to a different or additional leaf Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 200. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a software-defined network (SDN) infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

Figure 2B:
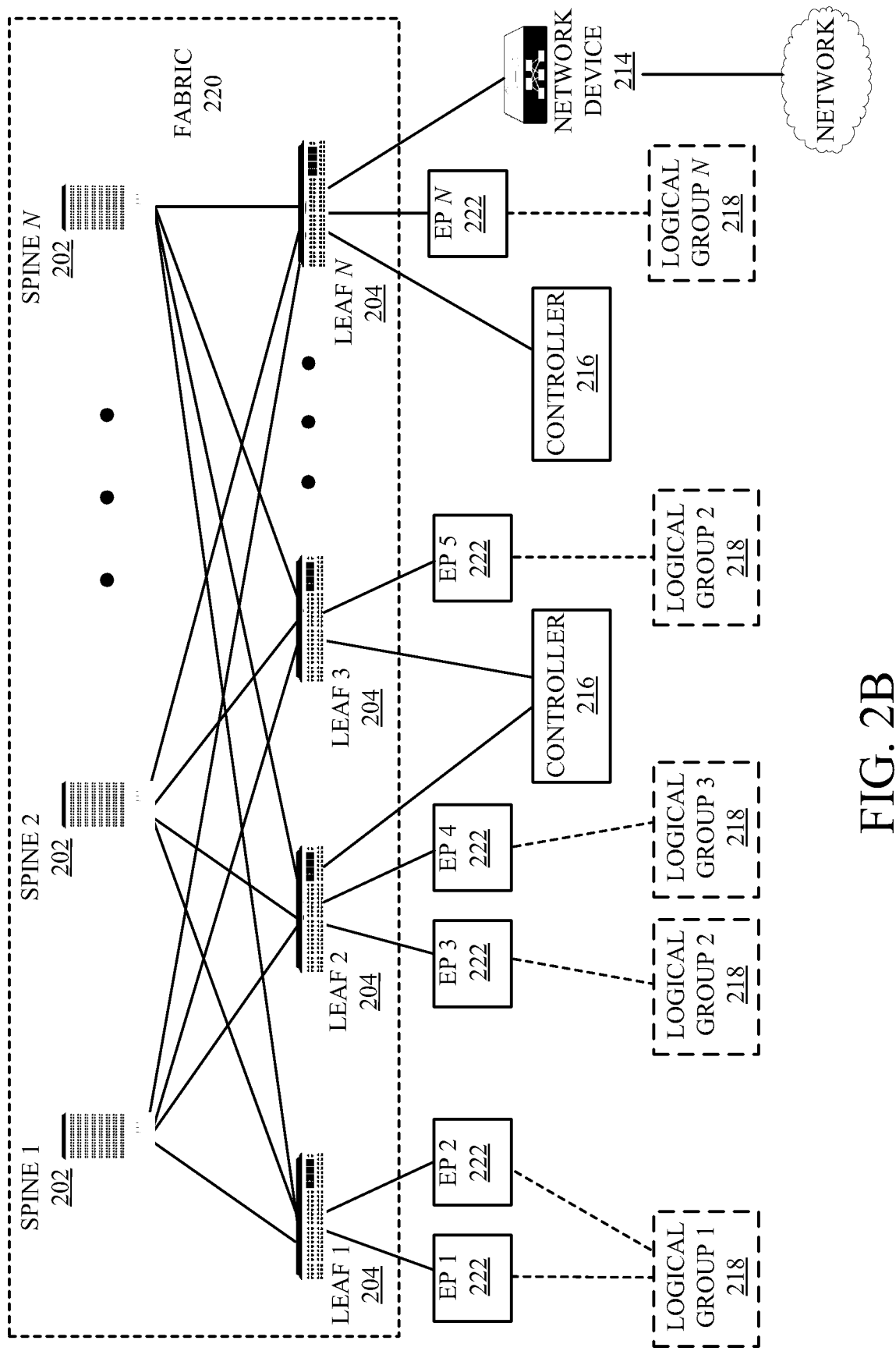
FIG. 2B illustrates another example of a Network Environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

The computing architectures shown in FIGS. 1A and 1B and the network environments shown in FIGS. 2A and 2B can be used to implement, at least in part, a data storage system, e.g. a database. A data storage system, as discussed herein, can be a distributed data storage system. A distributed data storage system can include clusters of nodes, otherwise referred to as distributed storage clusters. A distributed data storage system can be implemented as a distributed database. For example, a distributed data storage system can be implemented as a non-relational database that stores and accesses data as key-value pairs. Additionally, a distributed data storage system can be implemented across peer network data stores. For example, a distributed storage system can include peers acting as nodes within a distributed storage cluster that are connected and form the distributed storage cluster through an applicable network environment, such as the networks shown in FIGS. 2A and 2B.

In traditional databases, when a user transfers a large portion of data to be stored by the database management system, a user has to ensure that the entire portion of data is transferred and stored correctly by the database management system. In particular, cloud analytics often requires uploading of large files or amounts of data that a user has to ensure are transferred in order for analytics to subsequently process the files. In transferring large amounts of data, as a result of the large sizes of data, the data is transferred as part of a transaction. This presents problems if the database management system goes offline or the transfer of the data is otherwise interrupted. In particular, cloud-based data storage systems are more susceptible to connectivity issues leading to interrupted data transfer transactions. In traditional databases, if a transaction is interrupted, the transaction is restarted from the beginning regardless of how much of the transaction was actually completed. This is problematic because large amounts of resources, including network bandwidth, are consumed when restarting a transaction of data transfer from the beginning.

In order to provide functionalities for resuming a transaction, e.g. a bulk load transaction, portions of maintained storage logs for the transaction can be written into a persistent storage log implemented in persistent memory. The persistent storage log can be run to determine a point at which a bulk load transaction stopped. Subsequently, the bulk load transaction can be resumed based on the identified point when the transaction stopped without restarting the bulk load transaction from the beginning. This reduces an amount of resources used to complete the transaction, as the transaction does not have to be restarted from the beginning.

Additionally, in providing functionalities for resuming a transaction, log entries added to a storage log can be written to the storage log with a client tag that uniquely identifies a client associated with the transaction. The client tag can be used to filter out the log entries from the other log entries in the storage log and subsequently write the log entries into a persistent storage log based on inclusion of the client tag in the log entries. More specifically, only log entries in the storage log that include a client tag can be written into the persistent storage log, effectively limiting the number of entries written into the persistent storage log. Limiting the number of entries written into the persistent storage log is advantageous as persistent memory is expensive, thereby making complete redundancy between the storage log and the persistent storage log unfeasible.

Figure 3:
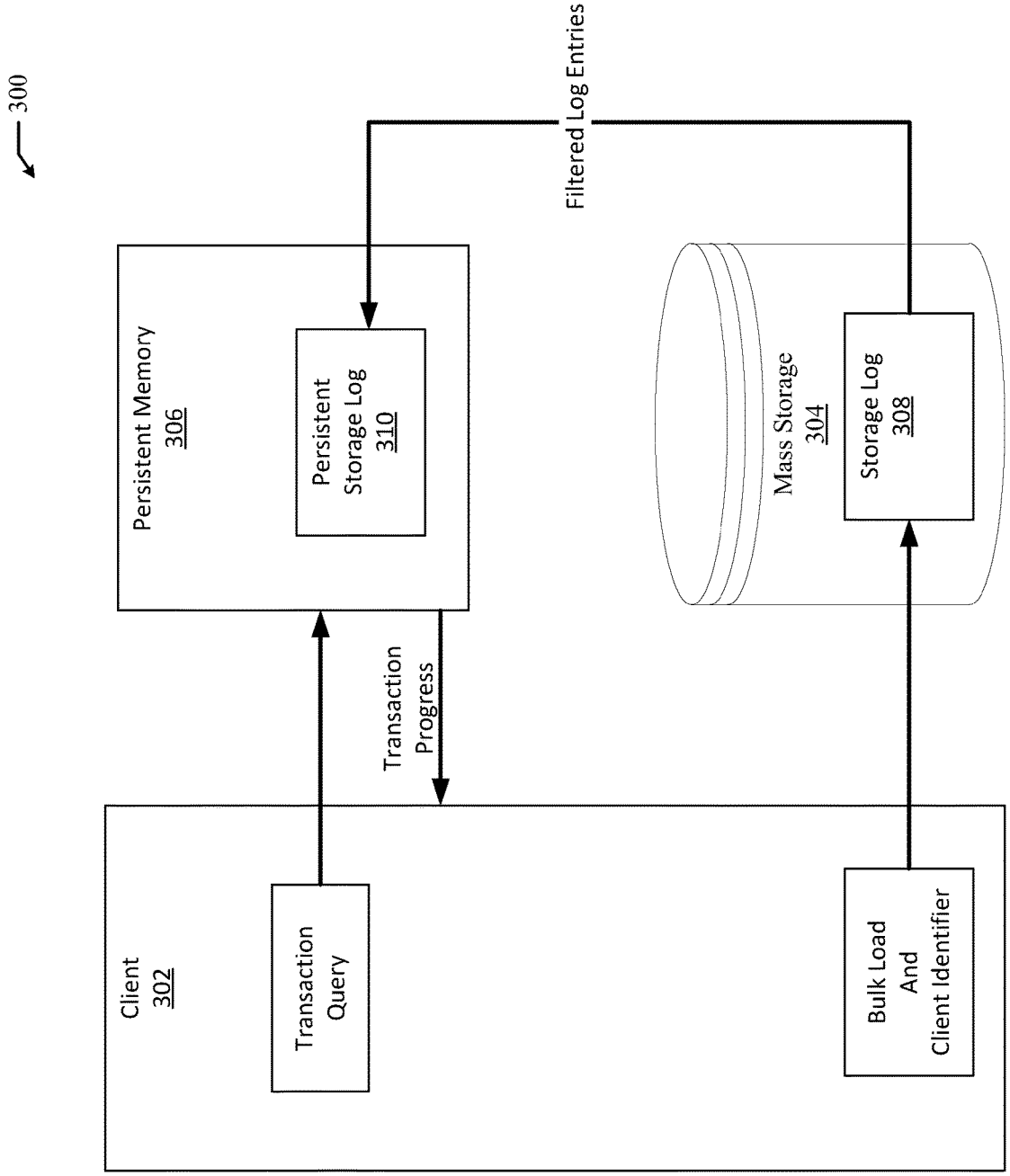
FIG. 3 depicts a diagram of a storage environment 300 configured to provide functionalities to resume transactions without restarting the transactions.

FIG. 3 depicts a diagram of a storage environment 300 configured to provide functionalities to resume transactions without restarting the transactions. The storage environment includes a client 302, a mass storage 304, and a persistent memory 306. The client 302 can be an applicable client for providing a bulk load for storage in a data storage system. For example, the client 302 can include a user who can upload files as part of a bulk load for use in performing cloud-based analytics. A data storage system can process a bulk load transaction by receiving portions of source data from a source. The data storage system can then insert received source data into one or more destination tables. This continues until all of the source data forming the bulk load is received at the data storage system and inserted into the one or more destination tables. Subsequently, the data storage system can send a commit acknowledgement back to the client in response to inserting all of the source data into the one or more destination tables.

The mass storage 304 and the persistent memory 306 can form, at least part of, an applicable data storage system, such as the data storage systems described in this paper. The mass storage 304 can include applicable disk storage for large amounts of data. Specifically, the mass storage 304 can include one or more disk drives that use one or a combination of electronic, magnetic, optical, or mechanical mechanisms for storing data. For example, the mass storage 304 can include a hard disk drive that uses magnetic storage to store data.

The persistent memory 306 can be an applicable form of persistent and/or non-volatile memory or be implemented at an applicable persistent and/or non-volatile memory storage devices. Herein, the terms persistent and non-volatile are used interchangeably and can refer to a computer memory storage that maintains or otherwise allows access to data stored therein even after a process that created or last modified the data ends. Additionally persistent and non-volatile memory can include memory capable of withstanding a power reset while still maintaining contents stored therein. For example, persistent and non-volatile memory can include flash memory that maintains stored data even after power to the flash memory is cut-off.

The mass storage 304 includes a storage log 308. The storage log 308 can be an applicable transaction log for a data storage system. The storage log 308 can be maintained for purposes of processing transactions for storing data at the mass storage 304. More specifically, the storage log 308 can include log entries of data written to data pages in the mass storage 304 as parts of transactions. For example, the storage log 308 for a specific transaction of storing data in the mass storage 304 can include one or a combination of a log sequence number for the transaction, a previous log sequence number for the transaction, a transaction identifier for the transaction, a data type of the transaction, and information about the actual changes to the mass storage 304, e.g. storing of data as part of the transaction. The storage log 308 can be updated during the course of a transaction. More specifically, the storage log 308 can be updated as more data in a bulk load is stored in the mass storage 304 as part of the transaction.

The mass storage 304 can receive a unique identifier from the client 302. A unique identifier for a client can include applicable data for uniquely identifying the client. For example, a unique identifier can include one or a combination of a MAC address, an IP address, and a name of a client. A unique identifier received from the client 302 can be used to create a client tag for the client 302. A client tag can include a unique identifier of a client and a transaction identifier of a specific transaction. A transaction for transferring a bulk load from the client 302 to the mass storage 304 can be tagged with a client tag. By tagging a transaction with a client tag, as will be discussed in greater detail later, a point at which a transaction is interrupted can be determined based on tagging of the transaction with the client tag. This allows the transaction to be resumed from the point where the transaction is interrupted instead of restarting the transaction from the beginning, thereby decreasing amounts of resources used to carry out the transaction. This is advantageous over traditional data storage systems that typically restart transactions that are interrupted. More specifically, traditional data storage systems typically roll back transactions that are not recorded as committed or otherwise completed, thereby consuming large amounts of resources to carry out the transactions by restarting the transactions.

In tagging a transaction with a client tag for the client 302, log entries written to the storage log 308 for the transaction can be tagged with the client tag, or otherwise include a unique identifier of the client. For example, a log entry in the storage log 308 created as a result of storing a portion of a bulk load from the client 302 into the mass storage 304 can be written with or otherwise include a unique identifier, e.g. MAC address, of the client 302. As additional log entries are written to the storage log 308 for a transaction, the log entries can be tagged with a client tag for the client 302. This ensures a progress of the transaction can be determined and used in resuming the transaction.

In various embodiments, not every transaction occurring at the mass storage 304 is tagged with a client tag. More specifically, the client 302 or another client can initiate a transaction that is not tagged with a client tag. For example, if a transaction is for a small amount of data, then the transaction can be skipped or otherwise not tagged with a client tag. This limits the number of log entries in the storage log 308, thereby limiting the number of log entries, as will be discussed in greater detail later, that are written to the persistent memory 306.

The storage log 308 can be maintained through write-ahead logging. More specifically, storage logs maintained in the storage log 308 can be written ahead of when corresponding portions of data are stored as part of the transaction. For example, before a portion of a bulk load is written into mass storage 304, a log entry corresponding to writing of the portion of the bulk load into mass storage 304 can be created in the storage log 308. Further in the example, the log entry corresponding to writing of the portion of the bulk load into mass storage 304 can be written with a client identifier if the transaction is tagged with a client tag, for use in resuming the transaction from a point where it was interrupted.

The persistent memory 306 includes a persistent storage log 310. The persistent storage log 310 can include log entries for transactions that are written to the storage log 308. For example, the persistent storage log 310 can store a log entry from the storage log 308 indicating a portion of a bulk load transfer was written to the mass storage 304 as part of a transaction. Log entries stored in the persistent storage log 310 can be used to determine progress of a transaction or a point where a transaction was otherwise interrupted or stopped. More specifically, the persistent storage log 310 can be replayed to determine a point where a transaction was interrupted or stopped based on log entries in the persistent storage log 310. For example, if a last log entry indicates a specific portion of a bulk load as part of a transaction was stored in mass storage 304, then the transaction can be resumed by requesting, receiving, or fetching a next portion of the bulk load after the last portion that was written to the mass storage 304. The persistent storage log 310 can be used to determine a point where a transaction was interrupted or stopped, e.g. a progress of the transaction after either or both the data storage system goes down or fails and a network connection between the client 302 and the data storage system fails.

In being implemented in the persistent memory 306, the persistent storage log 310 can be maintained even if power to the persistent memory 306 fails. More specifically, the persistent storage log 310 can be used to resume transactions in the data storage system even when the data storage system fails, e.g. power in the data storage system fails. This provides failover in the event that the storage log 308 loses its data, e.g. as a result of a power loss in the data storage system.

The persistent storage log 310 can store log entries filtered from the storage log 308. More specifically, the persistent storage log 310 can store log entries filtered from the storage log 308 based on the log entries being tagged or otherwise including a client tag. For example, log entries for one or more transactions that include client tags can be filtered from a plurality of log entries in the storage log 308 and subsequently be written to the persistent storage log 310. As a result, every log entry is not written from the storage log 308 to the persistent storage log 310, thereby allowing the persistent storage log 310 to be maintained in the persistent memory 306 despite the high cost of persistent memory. Further, as not every log entry in the storage log 308 is written to the persistent storage log 310, the persistent storage log 310 can retain log entries for longer amounts of time. As a result, transactions that are interrupted can be resumed without restarting the transaction using the persistent storage log 310 for longer periods of time after the transactions were actually interrupted.

Log entries in the storage log 308 can be written to the persistent storage log 310 at a log switch for the storage log 308. More specifically, log entries in the storage log 308 can be filtered out from an accumulation of log entries in the storage log 308 and subsequently be written to the persistent storage log 310 at a log switch of the storage log 308. A log switch of the storage log 308 can occur when a file or page of the storage log 308 that is being written to becomes full and a new file or page of the storage log 308 is created.

Log entries maintained in the persistent storage log 310 can be tagged with an explicit abort indicator signifying that a transaction associated with the log entries was explicitly aborted by the client 302. For example, if the client 302 aborts a transaction for a bulk load, then subsequent log entries written from the storage log 308 to the persistent storage log 310 can be tagged with an indicator signifying that the transaction was explicitly aborted. Resumption of transactions using log entries stored in the persistent storage log 310 can be controlled based on whether the log entries are tagged with explicit abort indicators. More specifically, the data storage system can refrain from resuming transactions with corresponding log entries in the persistent storage log 310 tagged with explicit abort indicators. As a result, resources used in resuming or attempting to resume transactions that are explicitly aborted can be conserved.

The data storage system can receive a transaction query for a transaction from the client 302. A transaction query can include a transaction identifier, a client identifier, and/or a request for a status of the transaction at the mass storage 304. A transaction query can be received in response to a transaction not being completed at the mass storage 304. For example, a transaction query can be received in response to a failed connection between the client 302 and the data storage system while a bulk load was being transferred from the client 302 to the mass storage 304. Additionally, a transaction query can be received from the client 302 after the client is disconnected from the data storage system and subsequently reconnects to the data storage system.

In response to a transaction query, the data storage system can provide an indication of a progress of a transaction back to the client 302. A progress of a transaction provided in response to a transaction query can be used to resume the transaction from a point where the transaction was interrupted without restarting the entire transaction. For example, a transaction progress can indicate that a first 30% of a bulk load was stored at the mass storage 304 and the client 302 can subsequently resume the transaction by beginning transfer of the remaining 70% of the bulk load to the mass storage 304.

In various embodiments, progress of a transaction is provided back to the client 302 as an offset integer indicating a stopping point of the transaction. The client 302 can use the offset integer to position a start of an input stream for a transaction. Subsequently, the client 302 can start the input stream for the transactions, e.g. the transfer of bulk data, at the starting point set using the offset integer, effectively resuming the transaction at a point where it stopped or was otherwise interrupted.

Figure 4:
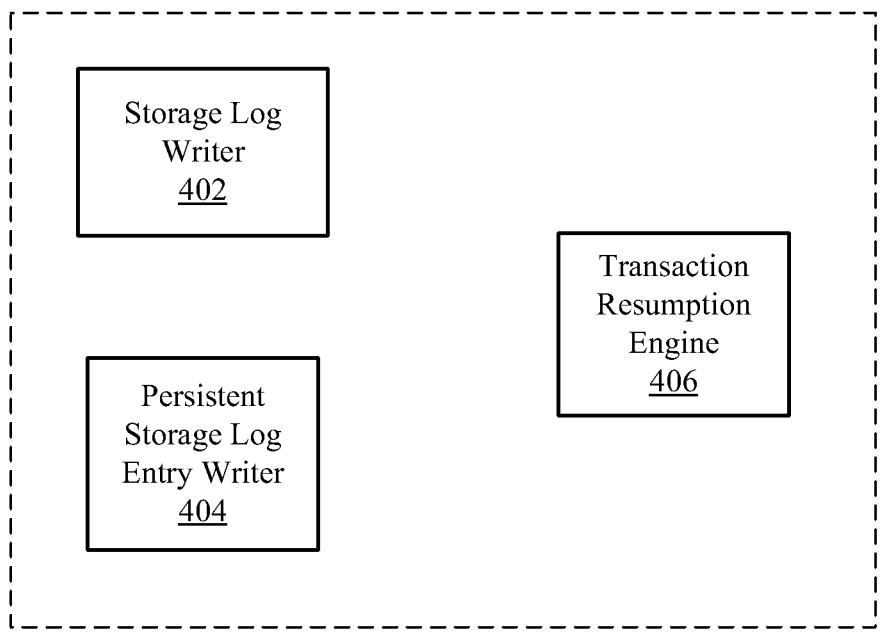
FIG. 4 depicts a diagram of an example log entry specific transaction management system.

FIG. 4 depicts a diagram of an example log entry specific transaction management system 400. The log entry specific transaction management system 400 shown in FIG. 4 can be configured to manage processing of transactions based on log entries for the transactions. More specifically, the log entry specific transaction management system 400 can control or facilitate resuming of transactions using log entries stored in persistent memory. For example, the log entry specific transaction management system 400 can identify a point in a transaction for a bulk load transfer where the transaction failed, which can subsequently be used to resume the bulk load transfer without starting over the transaction.

The log entry specific transaction management system 400 can be implemented at either or both an applicable data storage system, such as the data storage systems described herein, and an applicable client, such as the clients described herein. In being implemented at a data storage system, the log entry specific transaction management system 400 can maintain a persistent storage log implemented in persistent memory at the data storage system. Further, in being implemented at a data storage system, the log entry specific transaction management system 400 can use a persistent storage log of the data storage system to determine a progress of a transaction at the data storage system. In being implemented at a client, the log entry specific transaction management system 400 can control resuming of a transaction at the client. For example, the log entry specific transaction management system 400 can use an identified progress of a transaction for a bulk load transfer to resume the transaction by continuing to send portions of the bulk load that were not transferred previously, as indicated by the progress of the transaction.

The log entry specific transaction management system 400 includes a storage log writer 402, a persistent storage log entry writer 404, and a transaction resumption engine 406. The storage log writer 402 functions to write storage log entries for an applicable storage log in a data storage system, such as the storage log 308. The storage log writer 402 can write storage logs based on transactions occurring in an applicable mass storage, such as the mass storage 304. For example, the storage log writer 402 can write storage log entries as portions of data as part of a transaction are stored in mass storage. In another example, the storage log writer 402 can write storage log entries before portions of data are actually stored in mass storage.

The storage log writer 402 can tag transactions with client tags. In tagging transactions with client tags, the storage log writer 402 can write storage logs including client tags for transactions. For example, the storage log writer 402 can write a storage log entry including a transaction identifier and a client identifier as part of a client tag to a storage log.

Further in the example, the log entry can correspond to storage of a portion of a bulk load in mass storage as part of a transaction with the client.

The storage log writer 402 can selectively tag transactions with client tags. More specifically, the storage log writer 402 can select transactions to tag with client tags and subsequently tag the transactions and refrain from tagging other transactions with client tags. As a result of selectively tagging transactions with client tags, transactions tagged with client tags can be resumed based on tagging the transactions with the client tags, in the event that the transactions are interrupted. Further, as a result of selectively tagging transactions with client tags, transactions that are not tagged with client tags can be restarted from the beginning in the event that the transactions are interrupted or otherwise stopped.

The storage log writer 402 can selectively tag transactions based on data type. More specifically, the storage log writer 402 can tag transactions based on a type of data transferred from a client to a data storage system as part of the transactions. For example, the storage log writer 402 can tag transactions that include transfers of media file, e.g. video files, and refrain from tagging transactions that are only documents.

Further, the storage log writer 402 can selectively tag transactions based on data size. More specifically, the storage log writer 402 can tag transactions based on a size of data transferred from a client to a data storage system as part of the transactions. For example, the storage log writer 402 can tag transactions for transfer of bulk loads and refrain from tagging transactions for transfer of small loads. Further in the example, the storage log writer 402 can tag transactions for transferring an amount of data that is greater than a threshold amount of data, e.g. a configurable or user-specified threshold amount of data.

The storage log writer 402 can selectively tag transactions based on an identification of a client. More specifically, the storage log writer 402 can tag transactions that are sent from a specific client who has gained access to a right to resume transactions without having to restart the transaction from the beginning. For example, a customer can pay for a right to restart transactions based on client tags and subsequently, transactions for the customer at a data storage system can be tagged with client tags to allow the customer to resume the transactions if they are interrupted.

Further, the storage log writer 402 can selectively tag transactions based on one or a combination of applications associated with a transaction, a source of data included in a transaction, an amount of time it would take to restart a transaction from the beginning when compared to an amount of time to resume the transaction, and an amount of resources that would be consumed to restart a transaction from the beginning when compared to an amount of resources that would be consumed to resume the transaction. For example, if a transaction has just begun when it is interrupted, then the storage log writer 402 can determine to just restart the transaction from the beginning, and subsequently refrain from tagging the transaction.

The persistent storage log entry writer 404 functions to maintain an applicable persistent storage log implemented in persistent memory, such as the persistent storage log 310. In maintaining a persistent storage log, the persistent storage log entry writer 404 can write log entries into a persistent storage log. The persistent storage log entry writer 404 can write log entries and client tags from a storage log for mass storage into a persistent storage log. For example, the persistent storage log entry writer 404 can write a storage log entry corresponding to a portion of a bulk load written to mass storage as part of a transaction along with a client identifier and a transaction identifier of the transaction into a persistent storage log.

Further, the persistent storage log entry writer 404 can filter storage log entries in a storage log. More specifically, the persistent storage log entry writer 404 can filter storage log entries in a storage log for purposes of selectively writing the storage log entries into a persistent storage log. For example, the persistent storage log entry writer 404 can filter log entries for a specific transaction or a specific client from a plurality of log entries in a storage log. Further in the example, the persistent storage log entry writer 404 can write the log entries into a persistent storage log and refrain from writing other log entries of the plurality of log entries into the persistent storage log, e.g. as part of filtering the log entries.

The persistent storage log entry writer 404 can selectively write log entries from a storage log into a persistent storage log based on client tags. In writing log entries to a persistent storage log based on client tags, the persistent storage log entry writer 404 can write log entries into the persistent storage based on whether associated transactions are tagged with client tags, e.g. as part of filtering the log entries. For example, the persistent storage log entry writer 404 can write log entries that include client tags into a persistent storage log and refrain from writing log entries that lack client tags. Log entries with client tags that are written to a persistent storage log entry writer 404 can subsequently be used to resume transactions if the transactions are interrupted or otherwise stopped.

The persistent storage log entry writer 404 can write log entries from a storage log into a persistent storage log at configurable periodicity. For example, the persistent storage log entry writer 404 can write log entries from a storage log into a persistent storage log every ten minutes. Additionally, the persistent storage log entry writer 404 can write log entries from a storage log into a persistent storage log at a log switch. For example, the persistent storage log entry writer 404 can write log entries from a storage log when a page in the storage log becomes full.

Either or both the storage log writer 402 and the persistent storage log entry writer 404 can mark transactions as explicitly aborted. In marking a transaction as explicitly aborted, either or both the storage log writer 402 and the persistent storage log entry writer 404 can add an explicit abort indicator to log entries associated with the transaction. For example, if a client explicitly aborts a transaction, then the persistent storage log entry writer 404 can add explicit abort indicators to log entries associated with the transaction as the log entries are written from a storage log to a persistent storage log. In another example, the storage log writer 402 can write explicit abort indicators to log entries associated with an aborted transaction, and the persistent storage log entry writer 404 can subsequently write the log entries with the indicators from a storage log into a persistent storage log.

The transaction resumption engine 406 functions to control resuming of a transaction or facilitate resuming of the transaction without having to restart the transaction. In controlling resuming of a transaction, the transaction resumption engine 406 can determine a point where a transaction was interrupted and subsequently resume or provide functionalities for resuming the transaction from the point where it was interrupted. For example, the transaction resumption engine 406 can generate an offset integer indicating a point where a transaction was interrupted which can subsequently be used, e.g. by a portion of the transaction resumption engine 406 implemented at a client, to resume the transaction. Further in the example, the offset integer can be used to resume a data stream of a bulk load transfer at the point where the transaction was interrupted.

The transaction resumption engine 406 can identify progress of a transaction, otherwise a point where a transaction was interrupted, based on log entries in a persistent storage log. Specifically, the transaction resumption engine 406 can use log entries for a transaction to determine a last portion of data stored in mass storage as part of the transaction, which can subsequently be used to resume the transaction. The transaction resumption engine 406 can use an identification of a transaction and an identification of a client to determine a progress of the transaction for the client. For example, the transaction resumption engine 406 can use an identification of a client and an identification of a transaction to run through log entries in a persistent storage log to identify a last log entry of the transaction for the client, corresponding to a progress of the transaction for the client.

Additionally, the transaction resumption engine 406 can identify progress of a transaction based on a received transaction query for the transaction. Specifically, the transaction resumption engine 406 can receive a transaction query from a client including an identifier of a transaction and an identifier of the client. Subsequently, the transaction resumption engine 406 can use the identifiers of the transaction and the client to run through log entries in a persistent storage log to identify a progress of the transaction. The transaction resumption engine 406 can then provide the progress of the transaction back to the client, where the client can use the progress to resume transferring of data to a data storage system as part of the transaction.

The transaction resumption engine 406 can identify whether a transaction is explicitly aborted. More explicitly, the transaction resumption engine 406 can identify whether a transaction is explicitly aborted based on whether explicit abort indicators are included as part of log entries for the transaction in either or both a storage log and a persistent storage log. The transaction resumption engine 406 can control of provide functionalities for controlling a transaction based on whether the transaction is explicitly aborted, as identified by the transaction resumption engine 406. Specifically, the transaction resumption engine 406 can refrain from resuming a transaction that has been explicitly aborted by a client. As a result, resources are conserved as the resources are not used to resume a transaction that was actually aborted.

Figure 5:
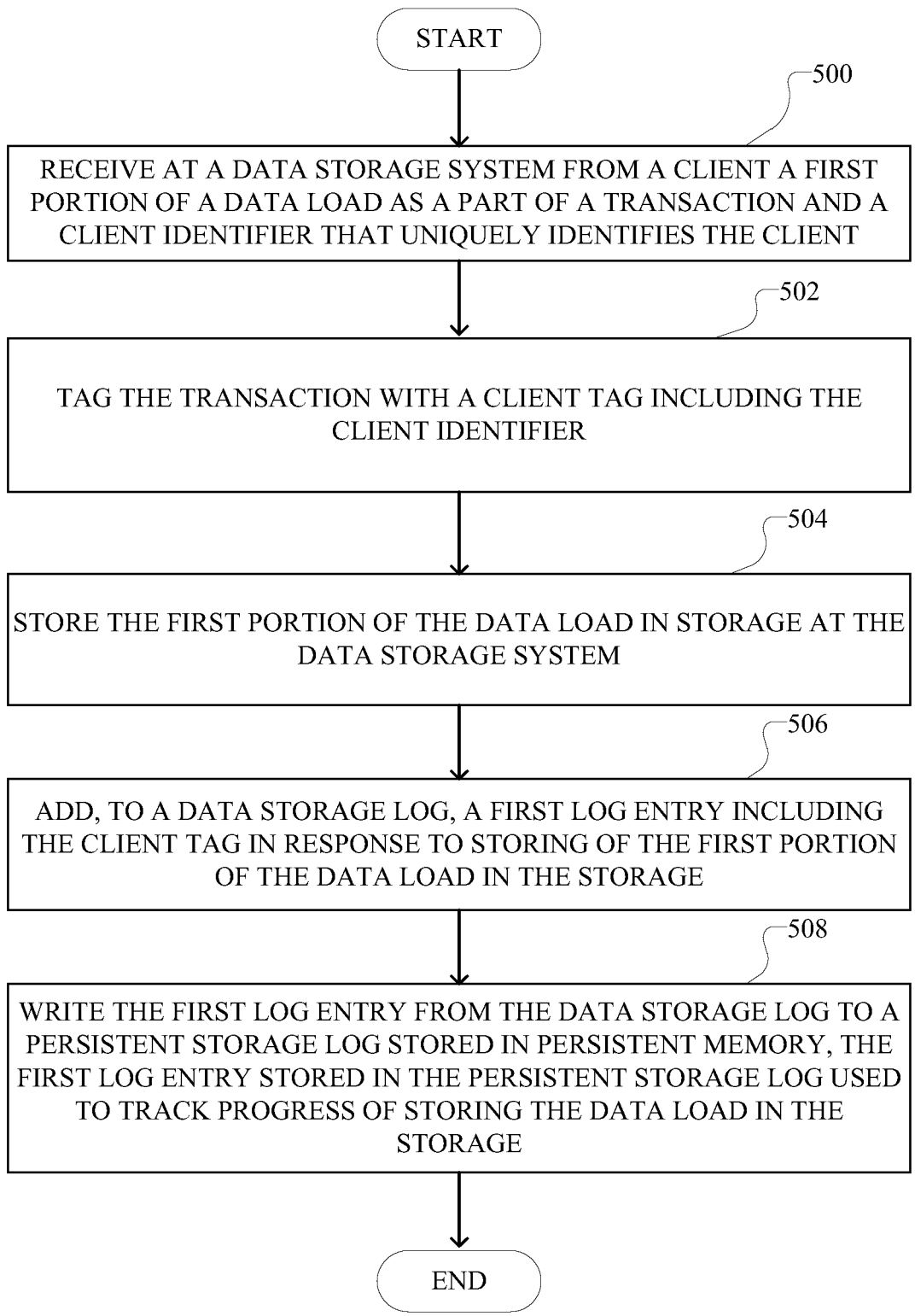
FIG. 5 illustrates a flowchart for an example method of maintaining a persistent storage log for use in resuming transactions with a data storage system.

FIG. 5 illustrates a flowchart for an example method of maintaining a persistent storage log for use in resuming transactions with a data storage system. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated.

Each module shown in FIG. 5 represents one or more steps, processes, methods or routines in the method. For the sake of clarity and explanation purposes, the modules in FIG. 5 are described with reference to the storage environment 300 shown in FIG. 3 and the log entry specific transaction management system 400 shown in FIG. 4.

At step 500, a data storage system receives, from a client, a first portion of a data load as part of a transaction and a client identifier that uniquely identifies the client. A first portion of a data load can be part of a bulk load that is uploaded to a data storage system. For example, a first portion of a data load can include bulk data used in performing cloud-based analytics. A received client identifier can be an applicable identifier for uniquely identifying a client and subsequently be used to form a client tag for the client. For example, a received client identifier can include a MAC address of a client which can subsequently be used to form a client tag that is unique for the client.

At step 502, the storage log writer 402 tags the transaction with a client tag including the client identifier. The transaction can be tagged with a client tag after it is determined to actually tag the transaction with the client tag for the client. Specifically, it can be determined to tag the transaction with a client tag based on a data type of the data load being transferred as part of the transaction. Alternatively, it can be determined to tag the transaction with a client tag based on data size of the data load being transferred as part of the transaction. Further, it can be determined to tag the transaction based on an identification or access rights of the client who initiated the transaction.

At step 504, the data storage system stores the first portion of the data load in storage. The data storage system can store the first portion of the data load in mass storage implemented at the data storage system. More specifically, the data storage system can store the first portion of the data load received from the client in disk storage forming mass storage.

At step 506, the storage log writer 402 writes a first log entry including the client tag to a data storage log in response to storing of the first portion of the data load in the storage. In alternative embodiments, a first log entry including the client tag can be written to a data storage log before the first portion of the data load is stored in the storage, e.g. as part of write-ahead logging. The storage log writer 402 can write a first log entry with the client tag in response to the transaction begin tagged with the client tag.

At step 508, the persistent storage log entry writer 404 writes the first log entry from the data storage log to a persistent storage log stored in persistent memory. Subsequently the transaction resumption engine 406 can use the first log entry stored in the persistent storage log to track progress of storing the data load in the storage. The persistent storage log entry writer 404 can write the first log entry from the data storage log to a persistent storage log in response to either or both the transaction being tagged with the client tag and the first log entry including the client tag, e.g. as part of filtering a plurality of log entries in the data storage log. A progress of storing the data load in the storage, as determined from the first log entry stored in the persistent memory, can be used to resume the transaction without starting the transaction over in the event that the transaction is interrupted.

Figure 6:
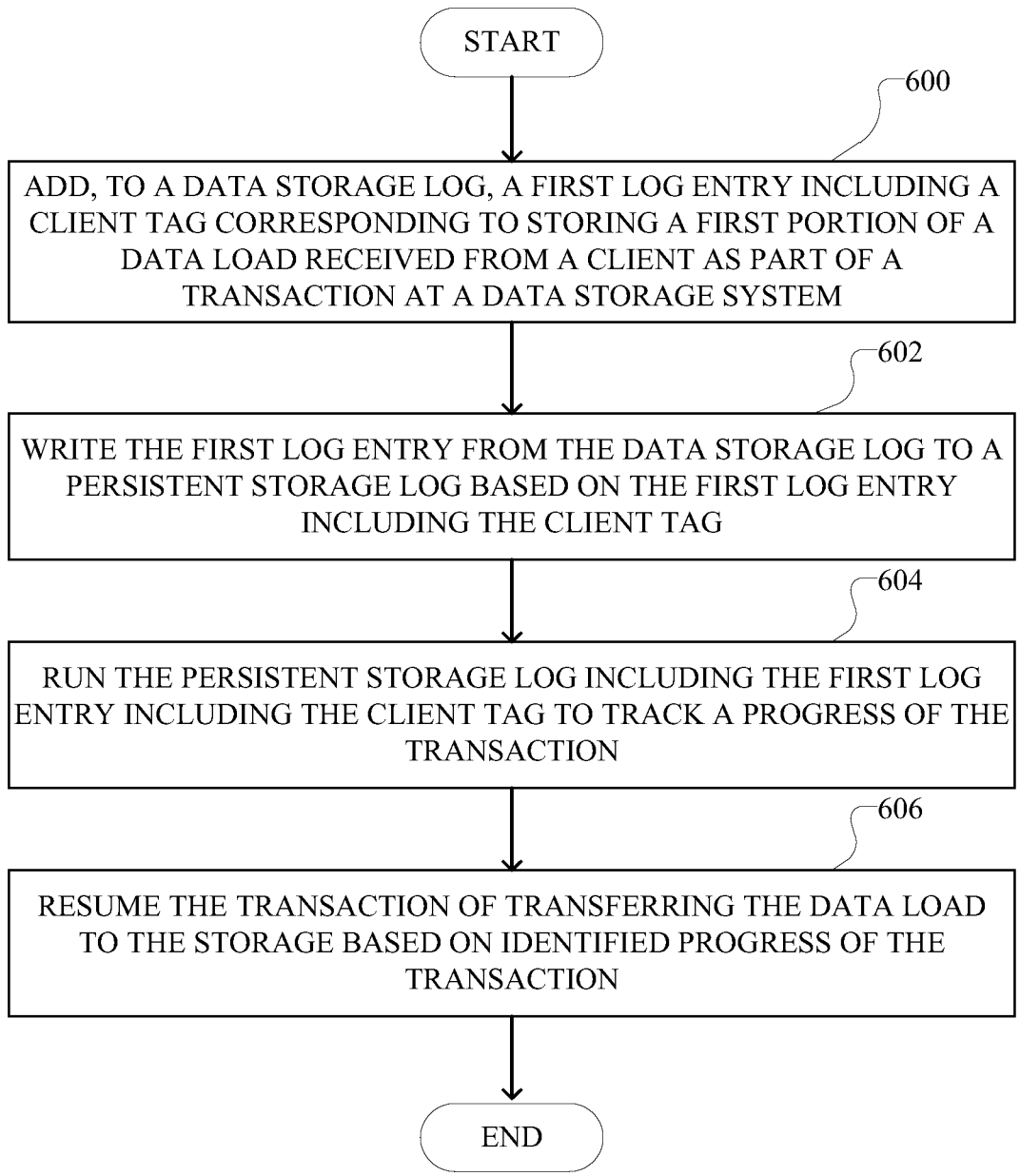
FIG. 6 illustrates a flowchart for an example method of resuming a transaction for a transfer of a data load to a data storage system using a persistent storage log implemented in persistent memory.

FIG. 6 illustrates a flowchart for an example method of resuming a transaction for a transfer of a data load to a data storage system using a persistent storage log implemented in persistent memory. The method shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated.

Each module shown in FIG. 6 represents one or more steps, processes, methods or routines in the method. For the sake of clarity and explanation purposes, the modules in FIG. 6 are described with reference to the storage environment 300 shown in FIG. 3 and the log entry specific transaction management system 400 shown in FIG. 4.

At step 600, the storage log writer 402 writes, to a data storage log, a first log entry including a client tag corresponding to storing of a first portion of a data load received from a client as part of a transaction. A first log entry can be stored along with a client tag as part of a transaction being tagged with the client tag. For example, if a transaction for a client is tagged with a client tag, then a first log entry, generated as part of the transaction, can be tagged with the client tag.

At step 602, the persistent storage log entry writer 404 writes the first log entry from the data storage log to a persistent storage log implemented in persistent memory. The first log entry can be written from the data storage log to a persistent storage log based on the first log entry including the client tag. More specifically, the first log entry can be filtered, based on including of the client tag with the first log entry, from a plurality of log entries in the data storage log. Subsequently, after being filtered from the plurality of log entries in the data storage log, the first log entry can be stored in the persistent storage log.

At step 604, the transaction resumption engine 406 runs the persistent storage log including the first log entry with the client tag to track a progress of the transaction. The persistent storage log can be used to track a progress of the transaction in response to a transaction query for the transaction received from the client. For example, the transaction can be interrupted due to a failed connection between the client and the data storage system, and the client can subsequently provide a transaction query for the transaction after the client reconnects to the data storage system. Further in the example, the transaction query received from the client can include an identification of the transaction and the client that are both used to track a progress of the transaction by running the persistent storage log.

At step 606, the transaction resumption engine 406 resumes the transaction of transferring the data load based on the identified progress of the transaction. In particular, the transaction resumption engine 406 can begin transferring data within the data load from a point where the transaction was interrupted in order to complete the transaction without restarting the transaction. As a result, resources are conserved as the transaction does not have to restart from the beginning.

The disclosure now turns to FIGS. 7 and 8, which illustrate example network devices and computing devices, such as switches, routers, load balancers, client devices, and so forth.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

FIG. 8 illustrates an example network device 800 suitable for performing switching, routing, load balancing, and other networking operations. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A computer-implemented method comprising:
   receiving, at a computing device and from a client at a data storage system, a portion of a data load as part of a transaction and a client identifier that uniquely identifies the client;
   determining if the transaction is aborted by the client or otherwise interrupted independent of any instruction to abort the transaction by the client;
   when the transaction is interrupted:
      tagging, by the computing device and based on both the client identifier and an access right of the client in resuming transactions through the data storage system, the transaction with a client tag, wherein the client tag comprises the client identifier;
      storing the portion of the data load in storage at the data storage system;
      adding, to a data storage log, a first log entry including the client tag in response to storing the portion of the data load in the storage at the data storage system; and
      selectively writing the first log entry from the data storage log to a persistent storage log separate from the data storage log and stored in persistent memory according to both a size of the transaction and whether the client has the access right based on an inclusion of the client tag in the first log entry; and
when the transaction is aborted by the client:
refraining from resuming the transaction based on an abort tag in a log entry for the transaction written from the data storage log to the persistent memory.

2. The computer-implemented method of claim 1, wherein the receiving occurs after the transaction has failed or is interrupted and wherein the computer-implemented method further comprises:
resuming transactions through the data storage system based at least in part on the client tag.

3. The computer-implemented method of claim 1, wherein the first log entry is written from the data storage log to the persistent storage log at a log switch of the data storage log.

4. The computer-implemented method of claim 3, further comprising:
comparing the size of the transaction to a threshold transaction size for selectively controlling writing of transaction log entries associated with a plurality of transactions from the data storage log to the persistent storage log based on corresponding sizes of the plurality of transactions; and
tagging the transaction with the client tag based on a comparison of the size of the transaction to the threshold transaction size.

5. The computer-implemented method of claim 1, wherein the first log entry is written from the data storage log to the persistent storage log at a log switch of the data storage log and the log switch is a time at which a page including the first log entry in the data storage log is full.

6. The computer-implemented method of claim 1, further comprising:
filtering, from a plurality of entries in the data storage log, a first subset of entries associated with transactions that are tagged with client tags, the first subset of entries comprising the first log entry including the client tag; and
writing the first subset of entries associated with the transactions that are tagged with client tags into the persistent storage log.

7. The computer-implemented method of claim 1, further comprising:
filtering, from a plurality of entries in the data storage log, a first subset of entries associated with transactions that are tagged with client tags, the first subset of entries comprising the first log entry including the client tag; and
writing the first subset of entries associated with the transactions that are tagged with the client tags into the persistent storage log, wherein the first subset of entries stored in the persistent storage log are used to track progresses of the transactions in storing data in the data storage system.

8. The computer-implemented method of claim 1, further comprising:
receiving, from the client at the data storage system, a second portion of the data load as part of the transaction;
storing the second portion of the data load in the storage at the data storage system; and
adding, to the data storage log, a second log entry including the client tag in response to storing the second portion of the data load in the storage at the data storage system.

9. The computer-implemented method of claim 1, further comprising:
receiving, from the client at the data storage system, a second portion of the data load as part of the transaction;
storing the second portion of the data load in the storage at the data storage system;
adding, to the data storage log, a second log entry including the client tag in response to storing the second portion of the data load in the storage at the data storage system; and
writing the second log entry from the data storage log to the persistent storage log stored in persistent memory, the second log entry used in combination with the first log entry to track a progress of storing the data load in the storage at the data storage system.

10. The computer-implemented method of claim 9, wherein the first log entry and the second log entry are written from the data storage log to the persistent storage log stored in persistent memory at a same log switch of the data storage log.

11. The computer-implemented method of claim 1, further comprising using the first log entry in the persistent storage log to resume the transaction according to a progress of storing the data load in the storage at the data storage system.

12. The computer-implemented method of claim 1, further comprising:
receiving a query from the client regarding a progress of the transaction in response to a failure to complete the transaction; and
using the query and the first log entry in the persistent storage log to complete the transaction in response to the query from the client.

13. The computer-implemented method of claim 12, further comprising using additional portions of the data load sent by the client in response to the progress of the transaction identified from the progress of storing the data load in the storage at the data storage system to complete the transaction.

14. A system comprising:
one or more hardware processors; and
at least one computer-readable storage medium having stored therein instructions which, when executed by the one or more hardware processors, cause the one or more hardware processors to perform operations comprising:
receiving, from a client at a data storage system, a portion of a data load as part of a transaction and a client identifier that uniquely identifies the client;
determining if the transaction is aborted by the client or otherwise interrupted independent of any instruction to abort the transaction by the client;
when the transaction is interrupted:
tagging, based on both the client identifier and an access right of the client in resuming transactions through the data storage system, the transaction with a client tag, wherein the client tag comprises the client identifier;
storing the portion of the data load in storage at the data storage system;
adding, to a data storage log, a first log entry including the client tag in response to storing the portion of the data load in the storage at the data storage system; and
selectively writing the first log entry from the data storage log to a persistent storage log separate from the data storage log and stored in persistent memory according to both a size of the transaction and whether the client has the access right based on an inclusion of the client tag in the first log entry; and when the transaction is aborted by the client:
refraining from resuming the transaction based on an abort tag in a log entry for the transaction written from the data storage log to the persistent storage.

15. The system of claim 14, wherein the receiving occurs after the transaction has failed or is interrupted and wherein the at least one computer-readable storage medium stores further instructions which, when executed by the one or more hardware processors, cause the one or more hardware processors to perform operations comprising:
resuming transactions through the data storage system based on the client tag.

16. The system of claim 14, wherein the at least one computer-readable storage medium stores further instructions which, when executed by the one or more hardware processors, cause the one or more hardware processors to perform operations comprising:
comparing the size of the transaction to a threshold transaction size for selectively controlling writing of transaction log entries associated with a plurality of transactions from a data storage log to a persistent storage log based on corresponding sizes of a plurality of transactions; and
tagging the transaction with the client tag based on a comparison of the size of the transaction to the threshold transaction size.

17. A non-transitory computer-readable storage medium having stored therein instructions which, when executed by a processor, cause the processor to perform operations comprising:
receiving, from a client at a data storage system, a portion of a data load as part of a transaction and a client identifier that uniquely identifies the client;
determining if the transaction is aborted by the client or otherwise interrupted independent of any instruction to abort the transaction by the client;
when the transaction is interrupted:
tagging, based on both the client identifier and an access right of the client in resuming transactions through the data storage system, the transaction with a client tag, wherein the client tag comprises the client identifier;
storing the portion of the data load in storage at the data storage system;
adding, to a data storage log, a first log entry including the client tag in response to storing the portion of the data load in the storage at the data storage system; and
selectively writing the first log entry from the data storage log to a persistent storage log separate from the data storage log and stored in persistent memory according to both a size of the transaction and whether the client has the access right based on an inclusion of the client tag in the first log entry; and
when the transaction is aborted by the client:
refraining from resuming the transaction based on an abort tag in a log entry for the transaction written from the data storage log to the persistent memory.

* * * * *